United States Patent
Pison et al.

(10) Patent No.: US 10,244,009 B2
(45) Date of Patent: Mar. 26, 2019

(54) FAST METHOD OF INITIALIZING A CALL FOR AN APPLICATION OF PTT TYPE ON AN IP-WAN CELLULAR NETWORK

(71) Applicant: CASSIDIAN SAS, Elancourt (FR)

(72) Inventors: Laurent Pison, Jouars Ponchartrain (FR); Olivier Paterour, Guyancourt (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/440,785

(22) PCT Filed: Nov. 5, 2013

(86) PCT No.: PCT/EP2013/003315
§ 371 (c)(1),
(2) Date: Sep. 14, 2015

(87) PCT Pub. No.: WO2014/082707
PCT Pub. Date: Jun. 5, 2014

(65) Prior Publication Data
US 2016/0044064 A1      Feb. 11, 2016

(30) Foreign Application Priority Data
Nov. 5, 2012   (FR) ...................................... 12 02964

(51) Int. Cl.
*H04L 29/06*      (2006.01)
*H04W 4/10*       (2009.01)
(Continued)

(52) U.S. Cl.
CPC ...... *H04L 65/1069* (2013.01); *H04L 65/1006* (2013.01); *H04L 65/1073* (2013.01);
(Continued)

(58) Field of Classification Search
CPC .. H04L 65/1069; H04L 65/1006; H04W 4/10; H04W 12/06; H04W 84/042
(Continued)

(56) References Cited

U.S. PATENT DOCUMENTS

| 7,170,863 B1 | 1/2007 | Denman et al. |
| 2004/0120474 A1* | 6/2004 | Lopponen ............... H04M 3/42 |
| | | 379/88.17 |

(Continued)

FOREIGN PATENT DOCUMENTS

GB          2 454 979 A1     5/2009

OTHER PUBLICATIONS

International Search Report as issued in International Patent Application No. PCT/EP2013/003315, dated Jan. 30, 2014.

*Primary Examiner* — Gregory B Sefcheck
*Assistant Examiner* — Majid Esmaeilian
(74) *Attorney, Agent, or Firm* — Pillsbury Winthrop Shaw Pittman LLP

(57) ABSTRACT

A method for initializing a call for a mobile terminal including PTT applications on an IP-WAN cellular network, the method including, for each user of the mobile terminal connected to an IP-WAN modem intended to register for a group call: upon starting up the IP-WAN modem, connecting the mobile terminal to the IP-WAN cellular network; when a PTT client is active and has obtained an IP address of a PTT server, initiating by the PTT client a procedure for registering a SIP with the PTT server on a default IP-WAN carrier; performing by the PTT client a procedure for affiliation to a call group with the PTT server on the default IP-WAN carrier, and as soon as the procedure for affiliation to the call group is performed, executing an "INVITE" (SIP) procedure to RTP resources at an application level on a PTT side and on the PTT client side, to allow the establishment
(Continued)

of the RTP session after the affiliation of the PTT client to the group.

13 Claims, 2 Drawing Sheets

(51) Int. Cl.
*H04W 12/06* (2009.01)
*H04W 84/04* (2009.01)

(52) U.S. Cl.
CPC .............. *H04W 4/10* (2013.01); *H04W 12/06* (2013.01); *H04W 84/042* (2013.01)

(58) Field of Classification Search
USPC ........................................................ 370/312
See application file for complete search history.

(56) References Cited

U.S. PATENT DOCUMENTS

| 2006/0077959 | A1* | 4/2006 | Beckemeyer ..... H04L 29/12103 370/352 |
| 2006/0116127 | A1* | 6/2006 | Wilhoite ........... H04M 3/42246 455/442 |
| 2007/0002779 | A1* | 1/2007 | Lee .......................... H04W 4/10 370/260 |
| 2007/0280256 | A1* | 12/2007 | Forslow .................. H04W 4/10 370/395.2 |
| 2009/0252084 | A1* | 10/2009 | Fodor ................. H04L 65/4061 370/328 |
| 2010/0015974 | A1 | 1/2010 | Stubbings |
| 2010/0142411 | A1* | 6/2010 | Holm .................. H04L 65/1063 370/259 |
| 2014/0106808 | A1* | 4/2014 | Agulnik .............. H04L 65/4061 455/519 |

\* cited by examiner

FAST METHOD OF INITIALIZING A CALL FOR AN APPLICATION OF PTT TYPE ON AN IP-WAN CELLULAR NETWORK

CROSS-REFERENCE TO RELATED APPLICATIONS

This is the U.S. National Stage of PCT/EP2013/003315, filed Nov. 5, 2013, which in turn claims priority to French Patent Application No. 12/02964, filed Nov. 5, 2012, the entire contents of all applications are incorporated herein by reference in their entireties.

FIELD OF THE INVENTION

This invention relates to the field of private digital mobile radio communications systems. It has applications particularly in private professional radio communications systems (or PMR system, for Professional Mobile Radio).

This radio communication system according to the invention has for purpose to provide PTT applications (for Push To Talk), that use an access infrastructure to a network of the radio type, based on a unicast IP-WAN technology (for IP Wide Area Network), such as 3G+, 4G, and others, the possibility of initialising communication rapidly.

STATE OF THE ART AND TECHNICAL PROBLEMS ENCOUNTERED

In the field of private digital mobile radio communications systems referred to in what follows as PMR system, there is a category of mobile terminals that use a so-called PTT (for Push To Talk, or Press To Transmit) communication. This communication method is performed over a half-duplex connection, and is based on pressing a button to switch the PMR terminal from a receiving state to a data emitting state, such as voice, in particular, but more generally data of any nature. Half-duplex connection means a communication channel that allows for data carriage in both directions, but not simultaneously, in other words, either as an uplink for a communication channel emitted from the terminal, or as a downlink, for a communication channel received by the terminal.

The Push To Talk communication method is a real time vocal service, implemented over a packet data network. As such, a PTT terminal provides direct communication by pressing a button and makes it possible to establish a link with another terminal or with a set of terminals.

In the framework of use for group calls that can range up to several hundred users, one of the main constraints of a PTT system is to be able to support a latency of 300 ms between a first user performing a vocal call by pressing the PTT button and all of the other users receiving this call. In order to carry out this call, there is initially a first step of signalling, then a second step of connecting the media and finally a third step that allows all the authorised users to be able to listen to the media emitting the call, to receive the flow of said call correctly.

This latency value is independent of the state of the call, and is always less than the maximum value of 300 ms. This latency value can even reach 500 ms in the case of a multiple system.

With regards to the current principle of narrowband PTTs, such as the PTT P25, TETRA, or TETRAPOL technologies, this value of 300 ms is reached by means:

of an application structure that manages the physical radio structure of the connection layer;

of dedicated physical resources allocated by channel (TCHs or Trunked CHannels);

of a physical resource allocated for the PTT signalling, in particular the CCH (Control Channel) as an uplink and as a downlink;

of a signalling band inside TCHs in order to define the rapidity of the signalling time for multiple users;

of an uplink dedicated to each TCHs/CCH channel in contention mode.

Consequently, each channel allocated to the physical connection layers, makes it possible to reach the 300 ms.

With regards to the current principle of PTTs on a cellular telephone or PoC (for PTT over Cellular) operating on BB or broad band technologies, the latter does not respond to the 300 ms real time constraints.

Indeed, in the case of a PoC operating on an OMA PoC protocol, the latter depends on the flow transport time. Currently, only the 3G+ and 4G technologies offer correct flow transport time, but not enough to reach all of the users of a group by respecting the 300 ms. Indeed, no resources of the IP-WAN and radio network are pre-allocated to an OMA POC session, since this leads to having to search for the mobile terminal in a zone known by the intermediary of sending a paging message over the Paging Channel (PCH)), and therefore the latency value of 300 ms is not reached for all of the users at their activation.

There is therefore a need to provide a technical solution that makes it possible to guarantee a latency of 300 ms for the initialisation of a group call for the PoC.

DISCLOSURE OF THE INVENTION

This invention aims to resolve all of the disadvantages of prior art. For this, the invention proposes a fast method of initialising an application call of the PTT type on an IP-WAN cellular network, according to any of the characteristics of claim 1 and of the following claims.

The invention is implemented by means of allocating resources on applications such as:

an individual session of signalling for the unicast of the uplink UL and of the downlink DL. As this signalling can be based on any SIP protocol (Session Initiation Protocol), making it possible to establish, modify and terminate a session; or ant protocol whether or not based on IP (Internet Protocol);

a Unicast individual session for a media as an uplink for each vocal emitting user (Talker) in the user group. In the rest of the description, the term media means that the latter contains data to be transmitted as for example IP packets of voice, videos, or other data;

a Unicast individual session of the media as a downlink for all of the vocal receiving users (Listeners) in the user group.

The media can be supported for any codec (Abbreviation which, in the framework of this description, corresponds to a software able to COde and DECode a piece of (or a set of) voice data, and transported as data. In general, the media is supported over the IP/RTP protocol (for Real Time Protocol) or any other protocol able to support the channel in real time, for the same quality of service or QoS (for Quality of Service).

The invention also comprises means of allocating resources on an extended transport network or WAN (for Wide Area Network), such as:

a Unicast UL/DL signalling for the data channel;

a data-carrying UL media for the vocal emitting user (or talker);

a date-carrying DL media for each vocal receiving user (listener). This is the principle of the multi-unicast, wherein each user of a call group is reached by a unicast method, a server being in charge for the multi-unicast of the flow to all of the receiving users of the call group.

The invention as such allows each user to be able to connect to a transport network, to be able to register with the PTT service and with other types of services such as video if needed.

The invention also allows each user to be able to register with one or more call group(s). By means of the invention, it is possible to listen to a group call as well as its radio activities. The user can be the first applicant of the call, by the intermediary of a PTT signalling procedure if the call has not yet been initialised.

The invention allows the user to receive the media as well as the signalling. It also allows for the changing of the right of speech granted to a user, on the request of the other users registered in the group and an arbitrage at the level of the PTT server.

The invention therefore has for object a method for initialising a call for a mobile terminal comprising applications of the PTT type on an IP-WAN cellular network, said method comprising the following steps, for each user of said terminal mobile connected to an IP-WAN modem intended to register for a group call:
  a step, that is triggered on the starting up of the IP-WAN modem, during which there is performed a procedure for connection to the IP-WAN network,
  a step, wherein when the PTT client is active, and wherein it has obtained the IP address of the PTT server, the PTT client is able to instigate a procedure for registering the SIP with the PTT server on the default IP-WAN carrier,
  a step, wherein the PTT client proceeds to a procedure for affiliation to a call group with the PTT server on the default IP-WAN carrier, characterised in that, in
  a step, wherein as soon as the procedure for affiliation to the call group is performed, an "INVITE" SIP procedure is executed to reserve RTP resources at the application level on the PTT server and on the PTT client side, in such a way as to allow the establishment of the RTP session immediately after the procedure of affiliation of the PTT client to the group.

The invention also comprises any one of the following characteristics:
  in order to carry out this SIP procedure, the PTT client sends a "SIP INVITE" invitation message for its PTT server in order to request the initialisation of an RTP session for the voice media;
  the step, during which there is performed a procedure for connection to the IP-WAN network, comprises an authentication phase, allowing the IP-WAN modem to be registered in the IP-WAN network;
  the procedure for connection to the IP-WAN network provided in the step during which there is performed a procedure for connection to the IP-WAN network allows the IP-WAN modem to be accessible by means of IP addresses allocated and associated with a default carrier, with a QCI defined in the HSS;
  before sending a SIP inscription to the PTT server, the PTT client has the possibility of obtaining the IP address of the PTT server from the DNS server;
  before sending a SIP inscription to the PTT server, the PTT client, has the possibility of obtaining the IP address of the PTT server from a manual configuration;

once the RTP session and the RTP port are allocated to the PTT server, a message indicating that the SIP 200 protocol is active "SIP 200 OK" is sent to the PTT client by including the IP address and the port of the PTT server for the RTP session;
  a heartbeat message is exchanged between the PTT server and the PTT client in order to keep the connection active at the level of the IP-WAN RRC radio, in order to maintain the RTP application session active and to carry out a supervision between the PTT client and the server;
  the RTP session remains active between the PTT server and the PTT client until deregistration of the PTT client, or the destruction of the group.
  if no activity is detected during a period which can be configured, typically 30 seconds, then, the PTT server releases the resources of the LTE network, but not the resources of the application RTP session, which remains active.

BRIEF DESCRIPTION OF THE FIGURES

The invention shall be better understood when reading the following description and when examining the accompanying figures. The latter are shown only for the purposes of information, and in no way limit the invention. The figures show.

DESCRIPTION OF THE INVENTION

Figure 1:
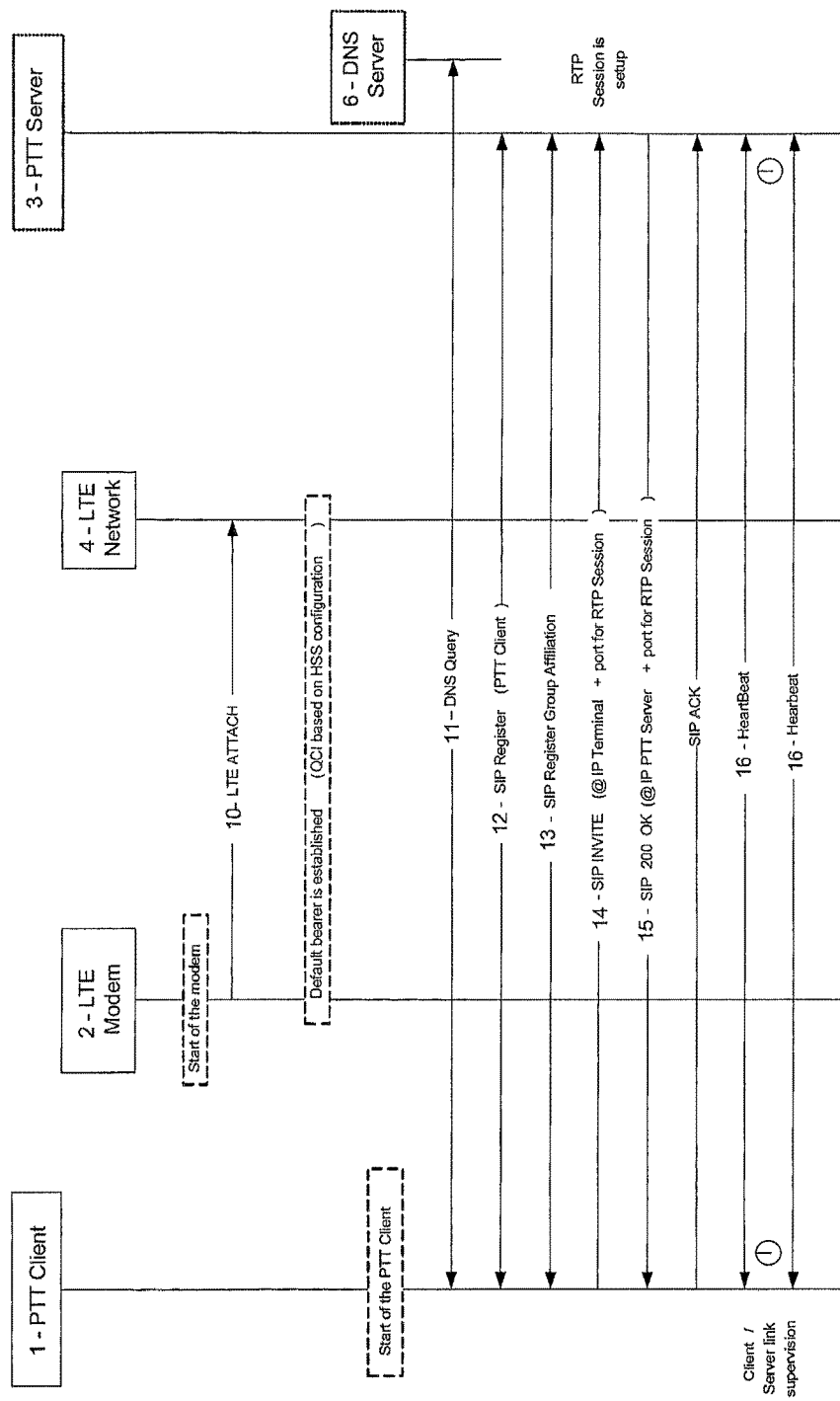
FIG. 1: a diagrammatical representation of the call flow during an initialisation phase of the resources of the PTT for each user registering for a group call with a PTT server, according to an embodiment of the invention.

Note that the figures are not to scale.

The following embodiments are examples. Although the description refers to one or several embodiments, that does not necessarily means that each reference relates to the same embodiment, or that the characteristics apply only to a single embodiment. Simple characteristics of different embodiments can also be combined in order to provide other embodiments.

In order to access a PTT applications server 3 (Push to Talk) via a terminal (not shown) of the Cellular telephone type, the terminal has a PTT client 1, 1a, 1b. As this type of cellular telephone is intended for an operation on one or several IP-WAN networks 4, such as LTE (for Long Term Evolution), and/or 3G (for 3rd Generation), and/or WIMAX (for . . . ), and/or WIFI, and/or any other type of broadband technology, it has for each type of IP-WAN network 4, a connection to a modem 2, 2a, 2b. In a preferred embodiment, this modem 2, 2a, 2b is directly built into the terminal. As such, the cellular telephone, provided respectively with both a PTT client 1, 1a, 1b and IP modem 2, 2a, 2b, forms a unit generally called a PoC (for PTT over Cellular).

The operation of this PoC terminal shall now be described in a very general way. An embodiment with an IP-WAN network of the LTE type will be taken in what follows in order to show the sequencing of the steps in FIGS. 1 and 2.

Initially, the PoC terminal is connected to a radio transport network 4 of the IP-WAN type. This PoC terminal is then authenticated and registered, when it is initialised by a user, both at the level of a register of users of the application or PTT client 1, 1a, 1b, but also at the level of a register of users of the group call application. This registering of the PoC terminal is very useful, in particular in order to be able to attach the terminal in what follows.

When the terminal PoC is connected to the IP-WAN network 4 and when it is registered at the various aforementioned registries, then the network 4 allocates media resources as an uplink and downlink between the PTT client 1 and the server 3, via for example a SIP procedure (for Session Initialization Protocol), with a invitation message "INVITE".

When the SIP procedure has already been executed, it is no longer necessary to execute it again, since the signal and the media for the group call will be used solely by the RTP media session.

It is then necessary to provide that these application and associated transport resources always remain installed and ready to support the traffic, whether it is a signal or a media, effectively.

At the level of the application, the resources need to be kept active until any deregistration of a user from the group.

At the level of the transport and more particularly at the radio level, the radio resources must be kept activated as long as possible. In other words, with regards to the LTE technology LTE (for Long Term Evolution), the RRC layer sis always active, and does not return to an idle state, even if there is little or no traffic supported by the connection. Indeed, if the RRC layer is in the idle state, it will then be necessary to send a paging to the terminal mobile in order to re-establish the radio connection and this will not make it possible to guarantee the 300 ms. This can be carried out by any periodic activity between a user and any application server, as for example, via a heartbeat message in order to keep the connection active and keep the RTP session active, for example, until deregistration of a PTT client PTT or the destruction of the group.

This can be applied for multiple group calls in parallel, inside the PTT voice application.

There can also be an application for PTT on other media transferred in the form of continuous flow, such as video, voice, combined video and voice, etc.

FIG. 1 is a diagrammatical representation of the call flow during an initialisation phase of the resources of the PTT for each user registering for a group call with a PTT server, via an LTE server, according to an embodiment of the invention.

As such, at a preliminary step 10, at the starting of the LTE modem 2, the procedure for connection of the LTE radio technology is instigated, including at the same time the authentication phase, allowing the LTE modem 2 to be registered in the LTE network 4. The result of this LTE connection procedure is that the modem 2 can be accessed by means of IP addresses allocated and associated with a carrier, with a signalling QCI (for QoS Class Indicator) which is not necessarily a default channel. This QCI is defined in the HSS, which is none other than the user database for 3GPP, including in particular the LTE technology. Indeed, the carrier is said to be a default carrier, because a name for the IP access point for a set of services in the network or APN (for Access Point Name) is dedicated to the PTT. An APN is expected for the voice services, and the default QCI can be for example QCI5 (which will be used for the SIP signalling) and QCI1 for the media.

At a step 11, before sending the SIP registration to the PTT server 3, the PTT client 1 has the possibility of obtaining the IP address of the PPT server 3 from the DNS server 6.

At a step 12, once the PTT client 1 is active, once it has obtained the IP address of the PPT server 3, via the DNS server or via manual configuration, in order to control the connectivity, the PTT client is able to instigate a procedure for registering the SIP with the PTT server 3 on the default LTE carrier.

At a step 13, the PTT client performs a procedure for affiliation of the group with the PTT server 3 on the default LTE carrier.

At a step 14, as soon as the procedure for affiliation to the call group is performed, an "INVITE" SIP procedure is executed to reserve RTP resources at the application level on the PTT server 3 side and on the PTT client 1 side. In order to carry out this SIP procedure, the PTT client 1 sends a "SIP INVITE" invitation message for its PTT server 3 in order to request the initialisation of an RTP session for the voice media. Note that the RTP session is initialised, but that the dedicated LTE carrier is not initialised at this step, in order to prevent unnecessary consumption of LTE GBR resources (for Guaranteed Bit Rate).

This step 14 has for advantage to allow for the establishment of the RTP session immediately after the procedure of affiliation of the PTT client 1 to the group. As such, when a request of the PTT client 1 occurs, because the latter is ready to dialogue on the RTP session, this is possible for it without needing to go through a step that executes the "SIP INVITE" procedure as in prior art.

Indeed, this "SIP INVITE" procedure is more or less long and requires execution simultaneously for each terminal of the group. In prior art, a sequence of sending the "SIP INVITE" request with acknowledgement "ACK" of said request must be carried out for all of the mobile terminals of the group, although with the invention only an "RTP PTT Start" message is required to establish the RTP session.

On the other hand, having established the RTP session at the earliest, this however requires keeping the connection active for a maximum in reactivity because otherwise the RCC radio layer can switch back to idle mode, which will require a paging at the time contacting the mobile terminal is needed.

Regardless of the time elapsed between two PTT requests, the RTP session remains active all the time, until the deregistration of the group from the PTT client 1, and is not released at the application level after 30 s, as is carried out conventionally in prior art as such preventing the guarantee for the 300 ms in latency.

At a step 15, once the RTP session and the RTP port are allocated to the PTT server 3, a message indicating that the protocol SIP 200 is active "SIP 200 OK" is sent to the PTT client by including the IP address and the port of the PPT server 3 for the RTP session.

At a step 16, once the RTP session is established, then a heartbeat message is periodically exchanged on the default carrier, in order to keep the RRC radio layer active and also to perform supervision between the PTT client and server. The heartbeat is one of the possibilities used to hold the established connections, but it is all the more so used if a supervision is imposed. Note nevertheless that any regular traffic can also hold the connection active without switching back to idle mode, as for example, the periodic re-establishing of a GPS position, or any other such traffic, of the presence or application supervision, etc.

Figure 2:
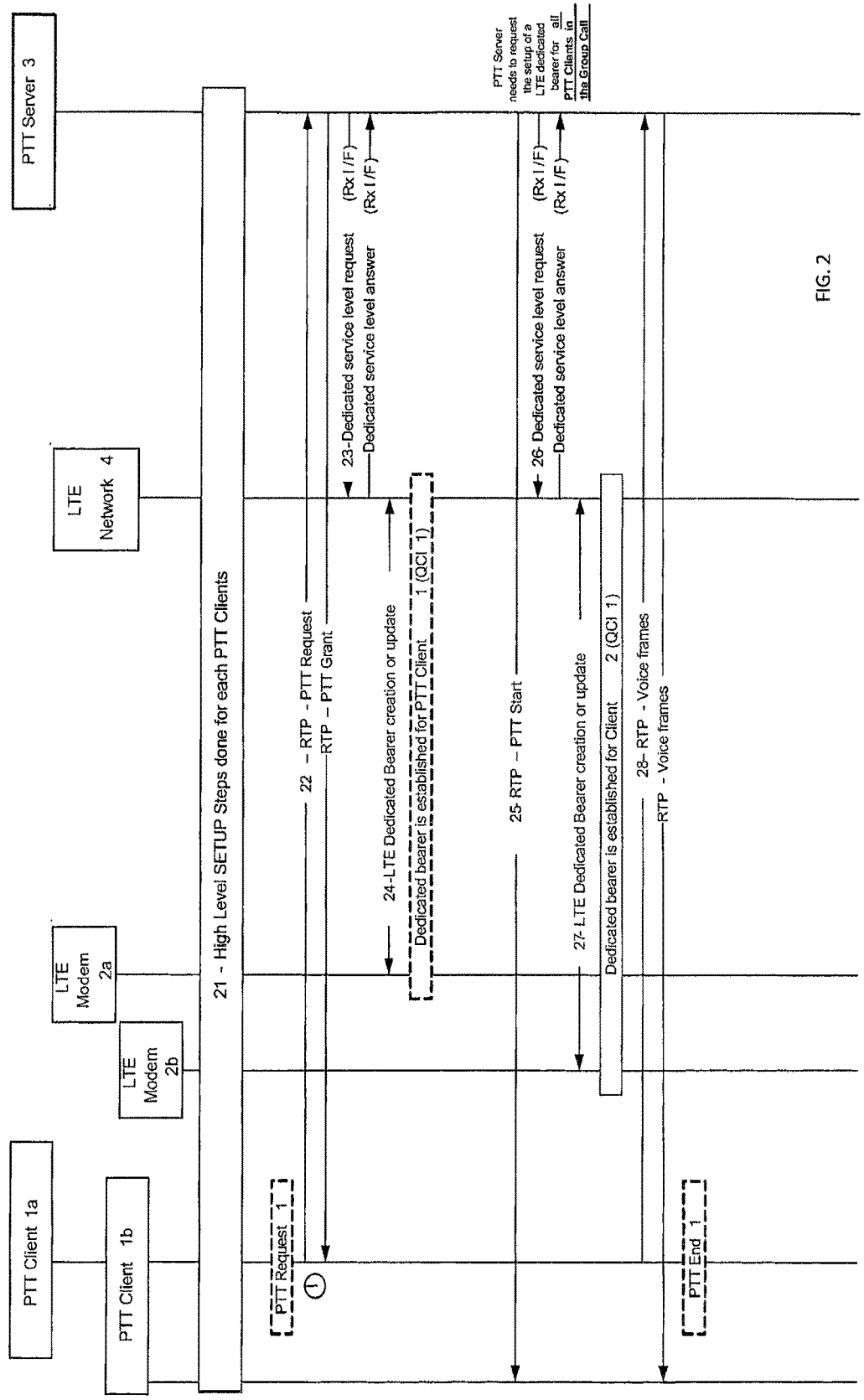
FIG. 2: a diagrammatical representation of the call flow during a PTT client primary request, according to an embodiment of the invention.

FIG. 2 is a diagrammatical representation of the call flow during a PTT client primary request respectively referenced as 1a and 1b, via an LTE network, according to an embodiment of the invention;

As such, at a step 21, steps 10 to 16 for initialisations described hereinabove are executed for each client PTT 1a, 1b, seeking to send a first PTT request on the RTP protocol.

At a step 22, the PTT client 1a initiates a PTT request, which is delivered to the PTT server 3. A time counter present at the level of the PTT client 1a determines the holding time of the delivery of the request to the PTT server 3.

At a step 23, executed solely for a use with an LTE network, the PTT server 3 emits requests towards the LTE network 4 in order to initialise the LTE resources, which will be dedicated to the QCI 1 carrier. The QCI 1 carrier is able, according to the characteristics of the 3GPP LTE standard, to support the voice service for PTT communication. Note that once the request has been taken into account by the LTE network 4, this does not mean that the LTE network 4 will succeed in establishing all of the suitable LTE resources required for this step. This step 23 is required to be executed for the first iteration.

At a step 24, the LTE network 4 initialises the dedicated LTE carrier. For the initialisation of the LTE carrier, this can be a creation or an update in the case where the latter exists. The LTE carrier is able to support the quality of service or QoS for the voice service for the PTT services, in the direction of the LTE QC1 carrier. The IP connection of the downlink and of the uplink is carried out in the LTE network 4 and in the modem 2a, 2b LTE, in order to route the packets of the downlink and of the uplink to the dedicated LTE carrier.

Note that if no activity is detected during a configurable period, typically 30 seconds, then the PTT server 3 releases the resources of the LTE network, but not the resources of the application RTP session, which remains active. Consequently, at the next PTT request delivered to the PTT server 3, the steps 23 and 24 are reiterated.

At a step 25, all of the PTT clients 1a, 1b, which are in the call group are informed that one of the PTT clients 1a, or 1b, wants to communicate with the other PTT clients of the call group, and receive a PTT communication start message "PTT Start" on the default LTE carrier.

At a step 26, for all of the PTT clients that are in the group, the requests of the PPT server 3 to the LTE network 4 initialise a carrier dedicated to the support of the voice service as defined hereinabove in step 23.

Steps 25 and 26 can be carried out in parallel.

At a step 27, for all of the PTT clients that are in the group, the LTE network 4 initialises the LTE dedicated carrier able to support the quality of service or QoS for the voice service for the PTT communications. In LTE this results in a carrier having a QCI with the value 1 or QCI1. The IP connection of the downlink and of the uplink is performed in the LTE network 4 and in the LTE modem 2a, 2b, in order to route the packets of the downlink and of the uplink to the dedicated LTE carrier.

At a step 28, voice frames are sent and distributed for all of the PTT clients 1a, 1b in the call group on the dedicated LTE carrier. Note that the heartbeat procedure is not activated as long as the voice frames are being exchanged.

The invention claimed is:

1. A method for initialising a call for a mobile terminal comprising applications of the push-to-talk (PTT) type for a PTT communication with a PTT server on an IP-WAN cellular network, said mobile terminal having both a PTT client and an IP-WAN modem that form a PTT over cellular (PoC) mobile terminal, said method comprising, for each user of said PoC mobile terminal connected to the IP-WAN modem intended to register for a group call:

a step, which is triggered on starting up the IP-WAN modem, during which is performed a procedure for connecting to the IP-WAN cellular network;

a step in which, when the PTT client is active, and when the PTT client has obtained an IP address of the PTT server, the PTT client instigates a procedure for registering a session initiation protocol (SIP) with the PTT server on a default IP-WAN carrier;

a step in which, the PTT client proceeds to a procedure for affiliation to a call group with the PTT server on the default IP-WAN carrier;

a step in which, as soon as the procedure for affiliation to the call group is performed, an "INVITE" SIP procedure is executed to reserve RTP resources at an application level on a PTT server side and on the PTT client side, in such a way as to allow the establishment of the RTP session immediately after the procedure of affiliation of the PTT client to the group, wherein in order to perform the "INVITE" SIP procedure, the PTT client sends a "SIP INVITE" invitation message to the PTT server to request the initialisation of the RTP session for voice media, and wherein the RTP session is established immediately after the procedure of affiliation of the PTT client to the group without initializing a dedicated carrier on the IP-WAN cellular network to support the voice media for the PTT communication with said group, and a step in which, after the RTP session has been established immediately after the procedure of affiliation of the PTT client to the group without initializing a dedicated carrier to support the voice media for the PTT communication with said group, the PTT client initiates a PTT request to the PTT server for establishing the PTT communication with said group over the IP-WAN cellular network, said step of initiating, by the PTT client, the PTT request to the PTT server being carried out without performing another "INVITE" SIP procedure and including a step of initializing the dedicated carrier on the IP-WAN cellular network.

2. The method according to claim 1, wherein the step, during which is performed a procedure for connecting to the IP-WAN cellular network, comprises an authentication phase, allowing the IP-WAN modem to be recorded in the IP-WAN network.

3. The method according to claim 1, wherein the procedure for connection to the IP-WAN network, provided for in the step during which is performed a procedure for connecting to the IP-WAN cellular network, allows the modem to be accessed by means of IP addresses allocated and associated with a default carrier, with a QCI defined in the HSS.

4. The method according to claim 1, wherein in a step, before sending a SIP inscription to the PTT server, the PTT client obtains the IP address of the PTT from a DNS server.

5. The method according to claim 1, wherein in a step, before sending a SIP inscription to the PTT server, the PTT client obtains the IP address of the PTT using a manual configuration.

6. The method according to claim 1, wherein in a step, once the RTP session and the RTP port are allocated at the PTT server, a message indicating that the SIP protocol 200 is active "SIP 200 OK" is sent to the PTT client by including the IP address and the port of the PTT for the RTP session.

7. The method according to claim 1, wherein in a step, a heartbeat message is exchanged between the PTT server and the PTT client in order to keep the connection active at the RRC IP-WAN radio level, in order to keep the RTP application sessions active and to perform supervision between the PTT client and the server.

8. The method according to claim 1, wherein the RTP session remains active between the PTT server and the client until the deregistration of the PTT client, or the destruction of the group.

9. The method according to claim 1, wherein at a step, if no activity is detected over a period which can be configured, then, the PTT server releases the resources of the LTE network, but not the resources of the application RTP session, which remains active, causing by this, that at the next PTT query delivered to the PTT server, the step is reiterated.

10. The method according to claim 9, wherein the period is 30 seconds.

11. The method according to claim 1, wherein the RTP session remains active between two PTT requests regardless of the time elapsed between the two PTT requests.

12. A method for initialising a call for a mobile terminal comprising push to talk or press to transmit, or both, (PTT) applications for a PTT communication with a PTT server on an IP wide area network (IP-WAN) cellular network, said mobile terminal having both a PTT client and an IP-WAN modem that form a PTT over cellular (PoC) mobile terminal, said method comprising, for each user of said PoC mobile terminal connected to an IP-WAN modem intended to register for a group call:

upon starting up the IP-WAN modem, connecting the PoC mobile terminal to the IP-WAN cellular network;

when the PTT client is active and has obtained an IP address of the PTT server, initiating by the PTT client a procedure for registering a session initiation protocol (SIP) with the PTT server on a default IP-WAN carrier;

performing by the PTT client a procedure for affiliation to a call group with the PTT server on the default IP-WAN carrier;

as soon as the procedure for affiliation to the call group is performed, executing an "INVITE" session initiation protocol (SIP) procedure to reserve real time protocol (RTP) resources at an application level on a PTT server side and on the PTT client side, in such a way as to allow the establishment of the RTP session immediately after the procedure of affiliation of the PTT client to the group, wherein executing the "INVITE" SIP procedure includes sending by, the PTT client a "SIP INVITE" invitation message to the PTT server to request the initialisation of the RTP session for voice media, and wherein the RTP session is established immediately after the procedure of affiliation of the PTT client to the group without initializing a dedicated carrier on the IP-WAN cellular network to support the voice media for the PTT communication with said group, and after the RTP session has been established immediately after the procedure of affiliation of the PTT client to the group without initializing a dedicated carrier to support the voice media for the PTT communication with said group, initiating by the PTT client a PTT request to the PTT server for establishing the PTT communication with said group over the IP-WAN cellular network, said initiating being carried out without performing another "INVITE" SIP procedure and including a step of initializing the dedicated carrier on the IP-WAN cellular network.

13. The method according to claim 12, wherein the RTP session remains active between two PTT requests regardless of the time elapsed between the two PTT requests.

* * * * *